UNITED STATES PATENT OFFICE.

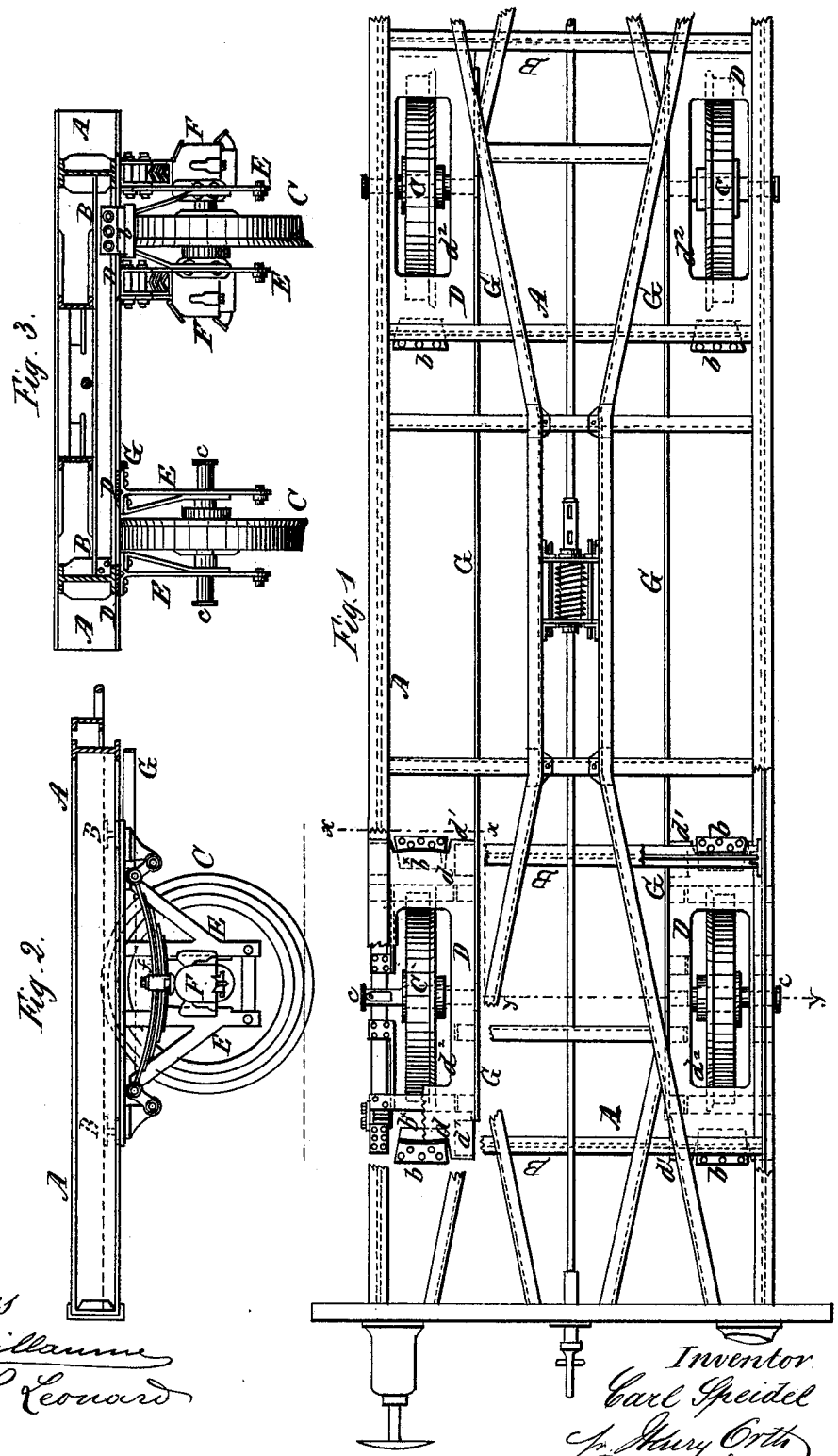

CARL SPEIDEL, OF CARLSRUHE, BADEN, GERMANY.

IMPROVEMENT IN CAR-TRUCKS.

Specification forming part of Letters Patent No. 202,881, dated April 23, 1878; application filed March 30, 1878.

*To all whom it may concern:*

Be it known that I, CARL SPEIDEL, of the city of Carlsruhe, in the duchy of Baden, Germany, have invented new and useful Improvements in Rolling-Stock for Railroads; and I do hereby declare that the following is a full, clear, and exact description of the same, reference being had to the accompanying sheet of drawings, in which—

Figure 1 is a plan view, partly in section, of a truck-frame mounted upon the carrying-wheels according to my invention. Fig. 2 is a side elevation, and Fig. 3 a vertical transverse section on lines $x\,x\,y\,y$ of Fig. 1.

It is well known that the greatest number of accidents on railroads are attributable to the breakage of the axles upon which the wheels are mounted, and so long as two wheels are mounted upon a common axle this breakage cannot be avoided, as it is the result of torsion when the wheels run at unequal speed, either from a difference in their diameter, caused by unequal wear, or when a train turns upon a curve of the track, which latter cause is the most fruitful source of breakages in the axles, it being well understood that the torsional action of the wheels when a train turns a short curve is very great.

My invention is designed to remedy these evils, and lessen or do away with the dangers arising from this source; and to this end my invention consists in certain new and improved means and arrangement of parts for mounting each wheel upon an independent or separate axle, so as to adapt the wheel to rotate not only on its horizontal axis, but, within certain limits, on a vertical axis passing through the center of the wheel, or nearly so.

The invention further consists in connecting two wheels, or two sets of wheels, upon the same side of a truck or car by means of spring-bars, all as hereinafter fully set forth.

In the drawings, A is the frame of a truck or car constructed in any usual or preferred manner. B B are metallic or other transverse girts, bolted to the frame A immediately in front and rear of the wheels C. Each of these cross-girts B carries a bracket, $b$, the upper face of which forms a segment of a circle, the center of which is that of the vertical center of the wheel, or nearly so. The portion $b^{\times}$ of this bracket $b$ projects some distance inward toward the wheels C, upon which projections $b^{\times}$ the carrying-plates D are supported and slide. The plates D are recessed, the recess forming a segment of a circle corresponding with that of the upper face of the bracket $b$, as shown at $d$, Fig. 1, the ears or projections $d^1$ on either side of the recess serving to limit the movement of the plate upon the bracket. The plate D has a central slot, $d^2$, through which the wheels project, as shown in the drawings. To the under side of this frame or supporting-plate are bolted the hangers E E, which carry the usual axle-boxes F, or axle-boxes of any desired construction, as the hangers can be readily made to conform to the desired style of axle-boxes to be used for the reception of the axles $c$ of the wheels C, and in front of these hangers are the supporting-springs $f$, connected to the carrying-plates D and axle-boxes F in the usual or any preferred manner.

G G are spring-steel bars, bolted or otherwise connected to the inner side faces of the carrying-plates D, extending from one wheel-frame to the other. The carrying-plates D are not bolted to the frame of the truck or car, or to the projecting parts of the brackets, but are supported by these brackets, and are so arranged as to slide thereon laterally, or, more properly, revolve thereon vertically in a limited arc of a circle the center of which is that of the vertical axis of the wheel. Thus, when a truck or car traverses a curve in the track, the wheels not only at once revolve with their respective speed—that is to say, the wheel on the longer radius will revolve with a greater speed than that on the shorter or inner radius of the curve in the track—but each wheel will also revolve slightly upon a vertical axis, as described, and maintain its vertical position with the rail. When the truck or car has passed the curve in the track, the spring-bars G, which have been slightly deflected by the vertical rotary motion of the wheels when turning the curve, will bring the carrying-plates and wheels back into their normal position.

With this arrangement and construction, another great advantage is obtained in the construction of the wheel itself, as it will be readily understood that, as each wheel forms an independent system, arranged to adapt itself to the rail, a slight difference, either by construction or through wear, existing in the diameter of the wheels will not affect their usefulness; but with the system now employed the greatest precautions are required to obtain and maintain the carrying-wheels with an equal diameter, which fact alone is a great source of expense in maintaining rolling-stock in safe running condition.

It will also be seen that this construction may be readily adopted in cars or trucks where the wheels are arranged by pairs upon opposite sides of the car or truck, or when more than two pairs of wheels are employed.

Having now described my invention, what I claim, and desire to secure by Letters Patent, is—

1. The combination, with the carrying-plate D, provided with a segmental recess on each end, and the supported wheel and its accessories, of the cross-girts B and brackets $b$, the upper face of which forms a segment, while the lower face projects under the supporting-plate, all arranged, constructed, and operating substantially as shown and described, for the purpose specified.

2. The combination of the movable plate D, provided with a segmental recess, $d$, and ears or projections, $d^1$, with the bracket $b$, to limit the motion of the wheel in its vertical rotation, substantially as described, for the purpose specified.

3. The combination, with the movable plates D and their supported wheels, of the spring-bars G, substantially as described, for the purpose specified.

4. The combination, in a car or truck, of the cross-girts B and brackets $b$, the plates D, hangers E, axle-boxes F, wheels C, and spring-bars G, connecting two wheels and their accessories on the same side of the truck or car, all constructed, arranged, and operating substantially as described, for the purpose specified.

This specification signed by me.

C. SPEIDEL.

Witnesses:
 MÜLLER.
 F. ENGLERT.